United States Patent
Hicks

(10) Patent No.: US 10,812,745 B2
(45) Date of Patent: Oct. 20, 2020

(54) BIT DEPTH REDUCTION OF IMAGE PIXELS

(71) Applicant: Luminar Technologies, Inc., Orlando, FL (US)

(72) Inventor: Richmond Hicks, Oviedo, FL (US)

(73) Assignee: Luminar Technologies, Inc., Orlando, FL (US)

( * ) Notice: Subject to any disclaimer, the term of this patent is extended or adjusted under 35 U.S.C. 154(b) by 56 days.

(21) Appl. No.: 16/353,366

(22) Filed: Mar. 14, 2019

(65) Prior Publication Data
US 2020/0296310 A1   Sep. 17, 2020

(51) Int. Cl.
*H04N 5/369* (2011.01)
*G06T 5/00* (2006.01)
*G06T 5/40* (2006.01)

(52) U.S. Cl.
CPC ......... *H04N 5/36965* (2018.08); *G06T 5/001* (2013.01); *G06T 5/007* (2013.01); *G06T 5/40* (2013.01)

(58) Field of Classification Search
CPC ..... H04N 5/36965; G06T 5/001; G06T 5/007; G06T 5/40
See application file for complete search history.

(56) References Cited

U.S. PATENT DOCUMENTS 7,760,938 B1   6/2010   Sikri et al.
2014/0212046 A1*   7/2014   Wong ................. G06K 9/38
                                                             382/194

* cited by examiner

*Primary Examiner* — Brenda C Bernardi

(57) ABSTRACT

The bit depth of the pixels in a camera image are reduced. In one embodiment, the number of pixels for each of a set of multiple bit intensity values is counted. A pixel intensity value with a lowest count is selected and a mapping function is generated that combines the pixels with the lowest count with pixels having an adjacent pixel intensity value. This is repeated until a total number of pixel intensity value counts is reduced to a predetermined number. A reduced bit depth image is generated using the predetermined number of pixel intensity value counts by assigning a new pixel intensity value to each of the pixels using the mapping function and the reduced bit depth image is sent to an image analysis system.

20 Claims, 11 Drawing Sheets

BIT DEPTH REDUCTION OF IMAGE PIXELS

TECHNICAL FIELD

The present description relates generally to image processing and in particular to reducing bit depth of image pixels.

BACKGROUND

Digital images typically have rows and columns of pixels (picture elements). Each pixel is defined by a value that represents the amount of one or more colors in the pixel. A black and white image may have a single numerical value e.g. from 0 to 255 for each 8 bit pixel that represents the brightness of the respective pixel. 0 corresponds to black, 255 corresponds to white and all of the numbers in between represent different levels of gray. For color images, different approaches are used. In some cases, each pixel has three values for each of the red, green and blue, or red, yellow and blue, or Y, U, V, or other components of the pixel. In some cases, there may be a fourth value for brightness. In some cases, each pixel may have only one color component so that multiple pixels are required to form the full color range. If each pixel value is represented by 8 bits or three sets of 8 bits, then there will be 256 possible values for the color or gray level of the pixel. 8-bit pixels provide more detail than can be rendered by many printers, televisions, and computer monitors and so 8 bits has become a standardized bit depth for still images and video.

For many observation and surveillance uses, greater image detail provides better results. Objects which may not have been visible at 8 bits may become visible at 16 bits. This is particularly true when a scene has very bright and very dark objects in close proximity. A classic example of a difficult scene includes a pedestrian in a very dark space behind an oncoming vehicle with bright headlights at night. Successful imaging would recognize the poorly lit pedestrian against the dark background and the positions of the headlights when pointed at or near the camera. An unsuccessful imaging might allow the bright headlights to completely obscure the pedestrian. A typical dynamic range of 8 bits per pixel is not enough to show the outlines of both the pedestrian and the vehicle headlights in the same image.

Improving digital camera image sensor technology provides greater bit depth. The available intra-frame dynamic range can be increased using a more expensive sensor with higher sensitivity. The dynamic range can also be increased by combining the data from multiple sequential frames each with different exposure times. Typically this is called HDR (High Dynamic Range) capture and combines a short exposure for bright object data, a medium exposure, and a long exposure for dark object data to produce a single frame with 16 bits or even 20 to 30 bits per pixel. HDR processing is built in to pre-processors of some sensors. Some such sensors compand the HDR images down to a 12-16 bit pixel depth.

Automotive imaging applications benefit greatly from large instantaneous, intra-frame dynamic range. Similarly a variety of other observation and surveillance systems also benefit in similar ways. The detail is particularly helpful in object detection, identification, and localization. A high sampling rate is also helpful in determining motion (motion vector generation). In some automotive applications this high bit depth, high frame rate camera data is added to lidar data for a much more complete understanding of the scene.

BRIEF DESCRIPTION OF THE DRAWINGS

The appended claims set forth the features of the invention with particularity. The present invention is illustrated by way of example, and not by way of limitation, in the figures of the accompanying drawings in which like reference numerals refer to similar elements.

DESCRIPTION OF EXAMPLE EMBODIMENTS

As described herein, the bit depth of image pixels from a high dynamic range image or frame is reduced. This is done without losing important contrast detail for later image understanding and analysis technologies. A deep 20 to 30 bit pixel depth allows for great detail to be obtained from each image. However, it increases the data transmission and data processing requirements of all downstream equipment. At 30 bits per color pixel, a typical 8 MP camera would produce 240 Mb per frame and at 30 frames per second, this comes to 7.2 Gb/s. Even at 12 bits per pixel, the data rate is 2.9 Gb/s. Higher resolution and higher contrast cameras produce still higher data rates.

The described approach reduces the bit depth of each picture in a frame, whether that is a single camera frame or a companded HDR frame. The approach applies to gray level and to color frames. The relative contrast information is preserved by selectively combining gray levels based on their popularity, density, frequency, or number of observations. Gray levels with low usage (as indicated in a histogram) are combined with adjacent gray levels that also have low usage. These combinations minimize the amount of detail information that is lost by making the combinations.

Figure 1:
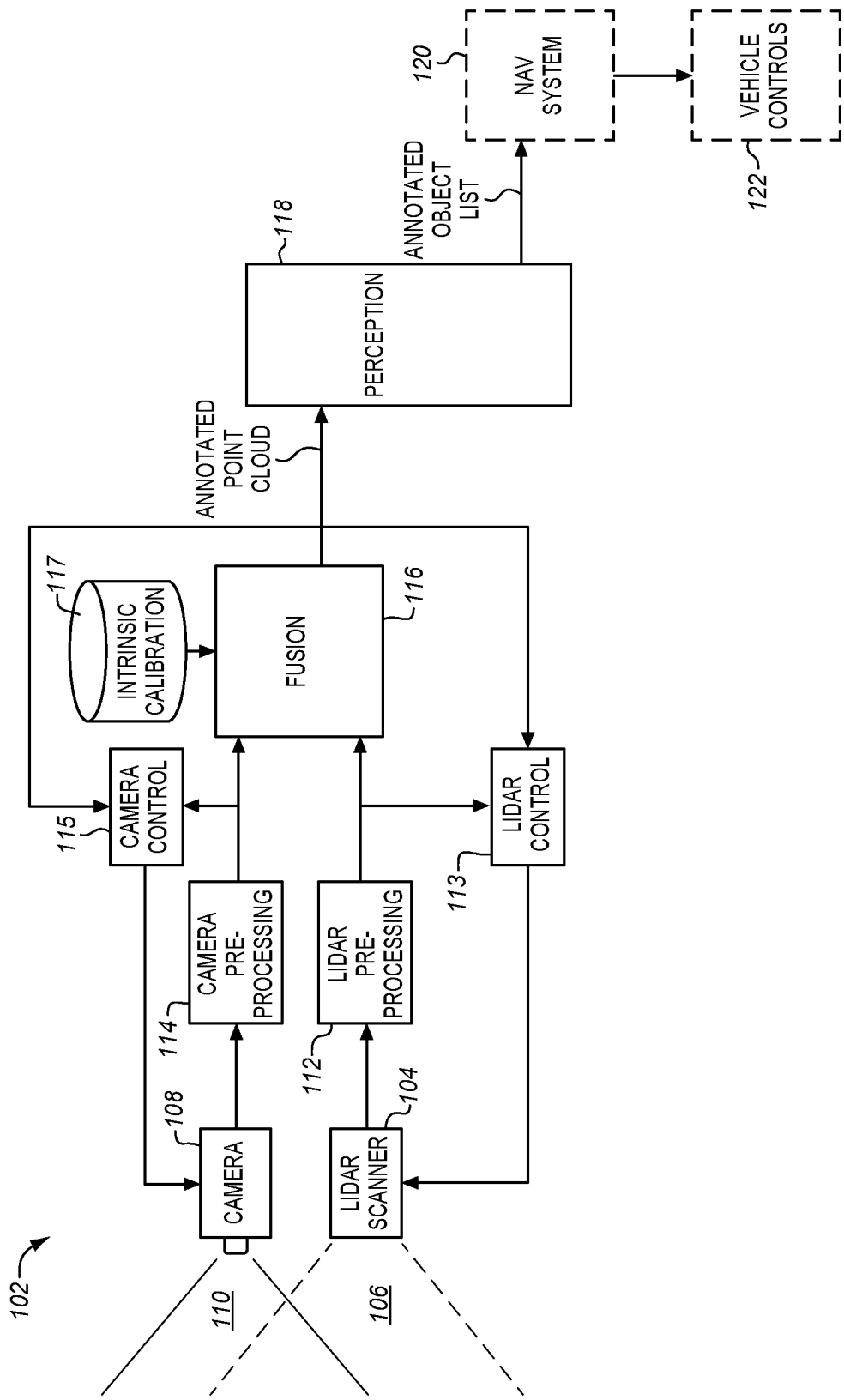
FIG. 1 is a block diagram of an example sensor system with a lidar and a camera.

FIG. 1 is a block diagram of a sensor system with a lidar 104 augmented with a visible light camera 108. The sensor system 102 has a lidar with a lidar field of regard 106 and a visible light camera with a camera field of regard 110. The two fields of regard overlap so that objects imaged by the camera are within the point cloud generated by the lidar. The scene within the fields of regard may be of a portion of the road in front of the vehicle and along which the vehicle is traveling. Other scenes may be views to the side and to the rear.

The lidar system has a lidar 104 coupled to a lidar controller 113 that drives and controls the lidar. The lidar output data is coupled to a lidar pre-processor 112 that receives return data generated by the lidar. There may be an optical system optically coupled to or integrated within the lidar system for directing laser light to the scene and laser reflections into a detector of the lidar 104. The lidar controller may be integrated into the lidar or the pre-processor or implemented as multiple components. The lidar pre-processor generates a point cloud in which each point represents a three-dimensional position in the scene in the field of regard. The particular configuration, resolution, and other information generated by the lidar processor and the manner of operation of the lidar processor may be modified to suit different implementations. The point cloud is sent to a fusion processor 116 which generates an annotated point cloud after fusion to be used by a perception engine 118 of the system. The fusion processor may alternatively be a part of the perception engine or independent as shown.

A navigation system, such as an autonomous vehicle (AV) navigation system may include a visible light camera for many purposes including to recognize traffic signs and signals that are not visible in the NIR (Near Infrared) or SWIR (Short Wavelength Infrared) spectrum that would typically be detected by the lidar. The visible light camera will have color information to distinguish, for example, symbols and numbers on a sign from the background of the sign. A typical lidar lacks color information, particularly in the visible light spectrum of the sign. It may also not have resolution high enough to read or distinguish signs at the required range. As a result, the visible light camera is very well suited to object detection and classification and there has been significant work on detection and classification methods for color images. The lidar has difficulty identifying some objects based only on the lidar data, but is very well-suited to determining distance, and size, and to tracking movement.

The visible light camera system has a camera 108 that generates digital images of the scene within its field of regard 110 as determined by an optical system that focuses light generated by or reflected from the scene onto a sensor of the camera 108. The images are sent to an image pre-processor 114 that is coupled to the camera. In embodiments, the camera operates at a frame rate and generates a new image or frame at a rate determined by the frame rate. The camera is also coupled to a camera controller 115. The frame rate may be determined by the camera controller or the image pre-processor or other upstream component. Alternatively, the camera may capture an image in response to a command from an external controller such as the perception engine 118 through the camera controller. The images may be 2D color representations of the scene. In some implementations, multiple cameras are used to determine depth or range from the cameras to the scene. Multiple cameras may also be used to provide information at different light wavelengths or with different fields of view.

A variety of different visible light cameras may be used, such as CMOS (Complementary Metal Oxide Semiconductor) or CCD (Charge Coupled Device) cameras, with different color and sensitivity characteristics. Visible light is suggested because objects designed for human perception are best perceived using visible light. In addition, visible light cameras and image processors are commonly available. The camera may have a different or extended spectrum so that only some colors are perceived or so that infrared or ultraviolet are also perceived by the camera. While 2D images are discussed herein, the camera may be replaced with a multiple sensor or 3D camera so that 3D images are provided and analyzed for object classification. For some object classification techniques, a 3D image provides more accurate results.

The fusion processor 116 combines the lidar point cloud and the camera image data and any other suitable system information to generate an annotated point cloud that represents the scene. Calibration data 117 is also provided to the early fusion processor to improve the accuracy of annotating the point cloud. The lidar and the camera frames will not be perfectly matched and may have different distortions with respect to the real world. The optical systems may be adjusted to improve alignment and the physical mounting structures for the two systems may be configured to reduce independent movement of the two systems. However, with higher resolution, the precision of the alignment must also be improved. In embodiments, the two fields of view are calibrated and correction or calibration factors 117 may be determined to correlate frames of the camera with frames of the lidar.

The fusion engine performs any of a variety of functions that may be performed with specialized hardware, parallel pipelines, or general purpose processing. These functions may include mapping voxels to pixels, estimating the motion of objects in the scene, correcting for distortions in the mapping and combining pixel and voxel data to form the annotated point cloud. Some embodiments may include more or fewer functions than those described.

The point cloud is provided to a perception engine 118 which applies perception techniques to the point cloud. This may include object classification that allows the future behavior of the object to be predicted. As an example, a tree will remain stationary and the outer periphery of the tree will likely bend in a collision. A pedestrian may move in any direction at any time, but will never move very fast. Perceiving the sizes and positions of particular objects in the scene allows the scene to be more fully characterized.

In some cases, the perception engine produces a 3D scene model. The 3D model may be used for any of a variety of different purposes. In this example, the model is optionally provided to a vehicle navigation system 120. The vehicle navigation system is optionally coupled directly or indirectly to vehicle controls 122 to direct the vehicle on an intended path. The vehicle is referred to herein primarily as an automobile but the systems and methods described herein are not so limited. Any type of land vehicle whether it drives on roads, paths, guideways, tracks, or open areas, indoors or outdoors, may benefit from the sensor and scene modeling systems described herein. Water vehicles, such as boats, ships, or submarines and airborne vehicles may also benefit from the systems and methods described herein. In addition while the system is described as having a field of regard in a direction of forward travel, sensors may be directed in other directions and additional sensors may be used to observe multiple directions simultaneously. The 3D model may include objects in multiple different directions from the vehicle. Such as a system may also be used for observation and surveillance from stationary location.

Figure 2:
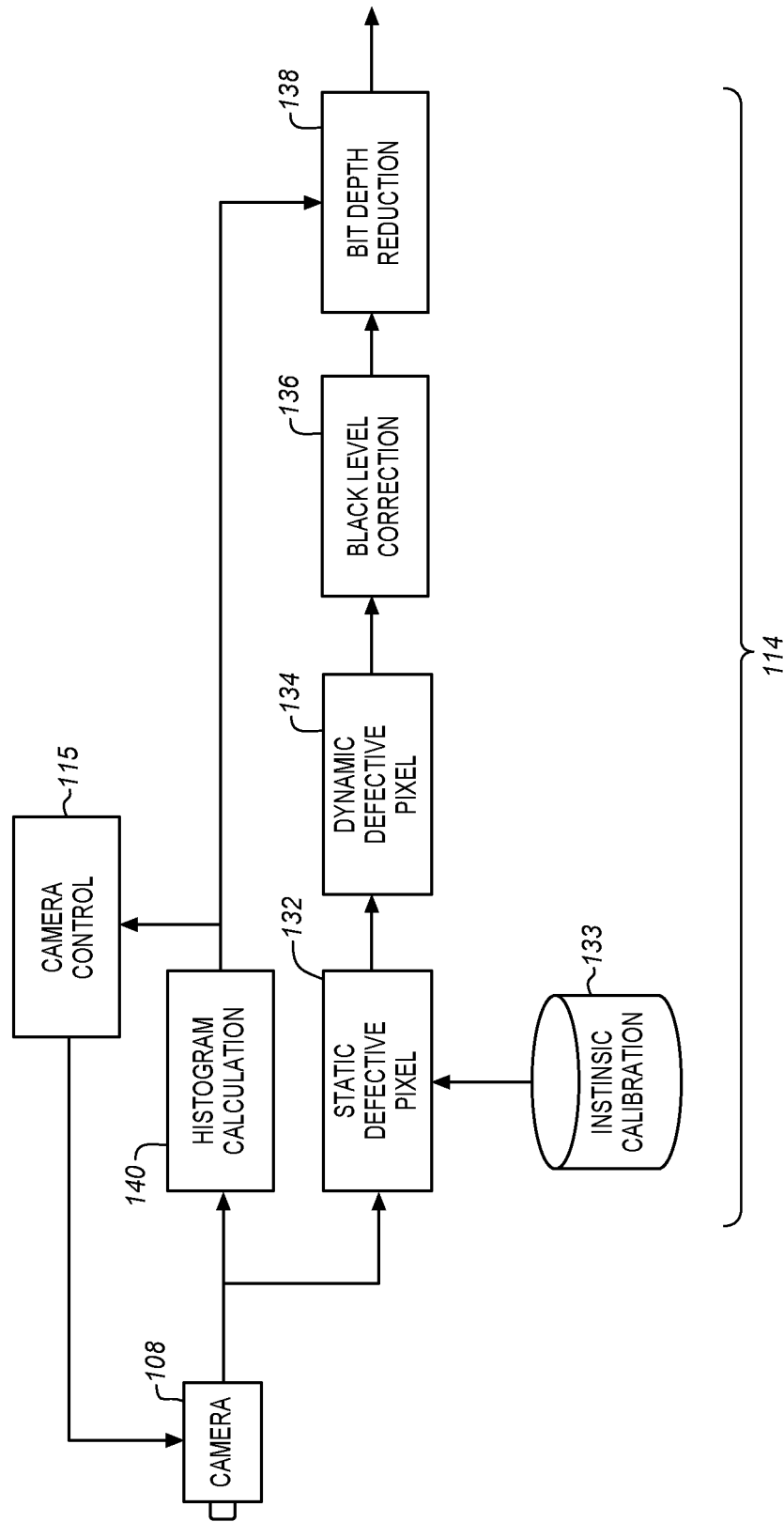
FIG. 2 is a block diagram of camera pre-processing components according to an embodiment.

FIG. 2 is a block diagram of a portion of the camera system of FIG. 1 showing components of the camera pre-processing 114. The camera 108 is coupled to a camera controller 115 that adjusts operational parameters of the camera. These parameters may include frame rate, field of view, exposure values and other parameters of the camera's operation. The image output of the camera is coupled to the camera pre-processor 114 which may be implemented on the same or a different device from the camera controller. The pre-processor processes the image for provision to the fusion engine 116 as shown in FIG. 1. In other implementations, there may be no fusion and the image is delivered directly to a perception engine 118 or other analysis unit.

The pre-processor has a histogram calculation 140 that may be used by the camera controller to adjust exposure values and frame rates among other parameters. The image may also be processed, adjusted, or compensated in a variety of other ways. In this example, the image is corrected for static defective pixels 132, for dynamic defective pixels 134 and for black levels 136. Calibration values for defective pixels, photodetector characteristics, optical defects or distortions and other parameters are stored in a memory 133 that is local or incorporated into the pre-processing module.

The image may also be processed for bit depth reduction 138. As shown, bit depth reduction is coupled to the histogram generator 140. As described the histogram is an input to the bit depth reduction and the bit depth reduction results in a modified output histogram that may be used to generate a new reduced bit depth image. Other approaches may alternatively be used to implement the described operations. The generation of a new histogram is provided as an example for illustration purposes and to show one of a variety of different embodiments. Bit depth reduction may be performed using a look up table that allows mapping between any gray levels. Bit depth reduction may also be modeled as a transfer function using a piece wise linear transformation. The number of pieces corresponds to the number of bits being considered, e.g. 255.

In some embodiments the process may be stated simply as constructing a histogram for an image, then sorting the histogram by bin values. As long as the number of bins exceeds the target number, e.g. over 256, then map the lowest count bin to a bin with an adjacent value. The adjacent bin being adjacent in bin value. The next bin up or down from the lowest count bin may be used or the lowest count bin may be mapped to the adjacent bin with the lesser count.

In other words, an image of a scene is received from an imaging sensor system. The image has multiple pixels, typically identified by rows and columns, and each pixel has a corresponding multiple bit intensity value. The pixels of the pixel intensity value with the lowest pixel count are mapped to an adjacent pixel intensity value. The mapping is repeated until a total number of different pixel intensity values is reduced to a predetermined number of different pixel intensity values. A mapping function is generated that combines the pixel mappings and used to generate a reduced bit depth image using the predetermined number of pixel intensity values. A new pixel intensity value is assigned to each of the pixels using the mapping function and this image is then to an image analysis system.

Figure 3:
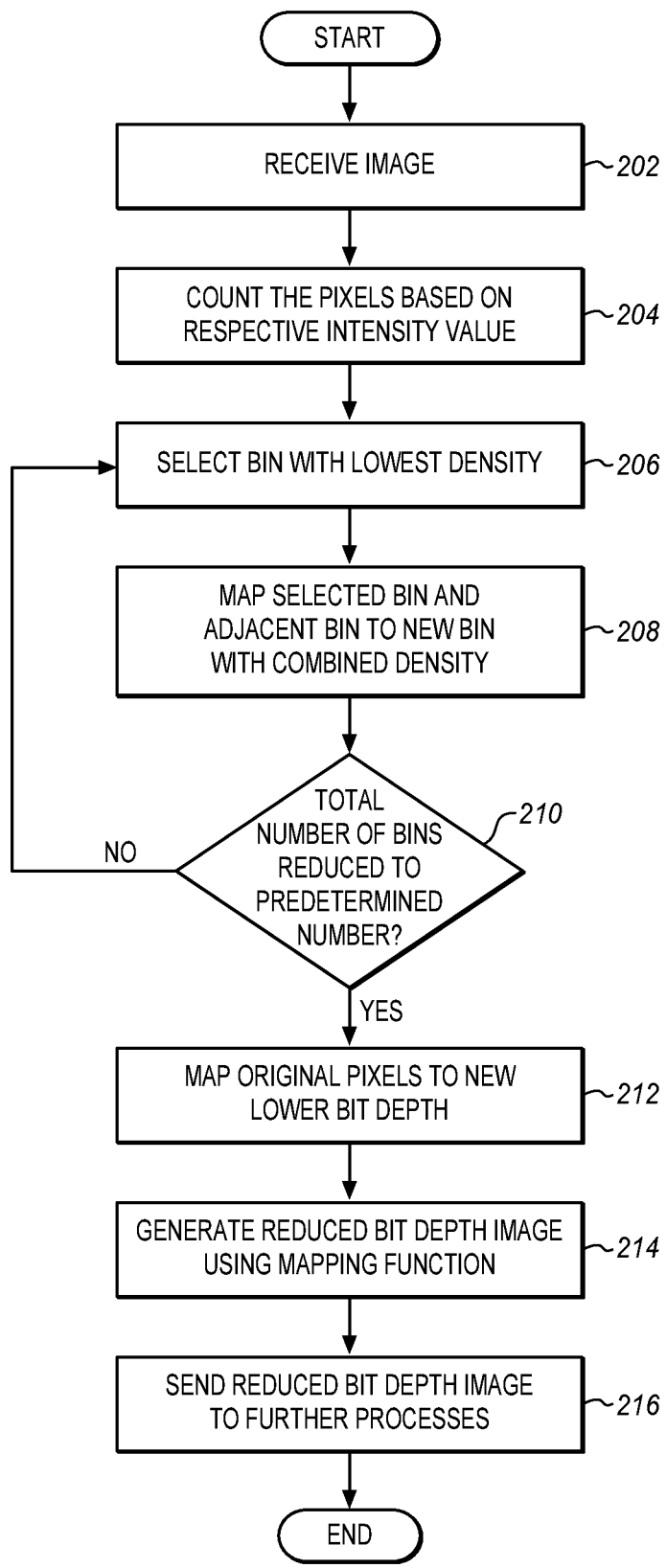
FIG. 3 is a process flow diagram of reducing bit depth in static or video images according to an embodiment.

FIG. 3 is a process flow diagram of reducing bit depth in static or video images based on a similar process. The process starts at 202 with receiving an image. In the example of the hardware of FIG. 1, the image may be from a visible light camera sensor taken of a scene in front of a vehicle. However, the image may come from different sources and have different characteristics. The image may be from a long term store or from a camera delivered in real time. The image has a plurality of pixels and each pixel has a corresponding multiple bit value. The pixel value may represent visible, infrared, or ultraviolet light, or a combination. The pixels may indicate one color component or a composite value of color components, including gray scale. In some embodiments, the image is an HDR image that has been compiled in a prior operation. The pixel bit depth may represent the full HDR bit depth or a companded bit depth compiled by the camera in prior operations.

At 204 the number of pixels having each possible intensity value are counted. This is sometimes referred to as binning each pixel into a histogram. The operations are described herein in the context of a histogram but any other counting methodology may be used. In an example, another structure that has multiple bins is used. As used herein, each bin has a value that represents the number of pixels having a corresponding intensity value, i.e. the multiple bit intensity value for the respective color. In some cases, the intensity values at each end of the brightness spectrum, e.g. 0 and 255, may be ignored or other or additional particular values may be ignored. After the pixels are counted or binned, then each possible intensity value will have a density that represents a number of pixels that have the respective multiple bit value. Accordingly, if 327 pixels of the image have a gray value of 48, then bin 48 has a density of 327. While density is used herein, density is also referred to as popularity, frequency, number of observations, and by other terms. The embodiments described herein are not limited by the use of a particular terminology.

Figure 4:
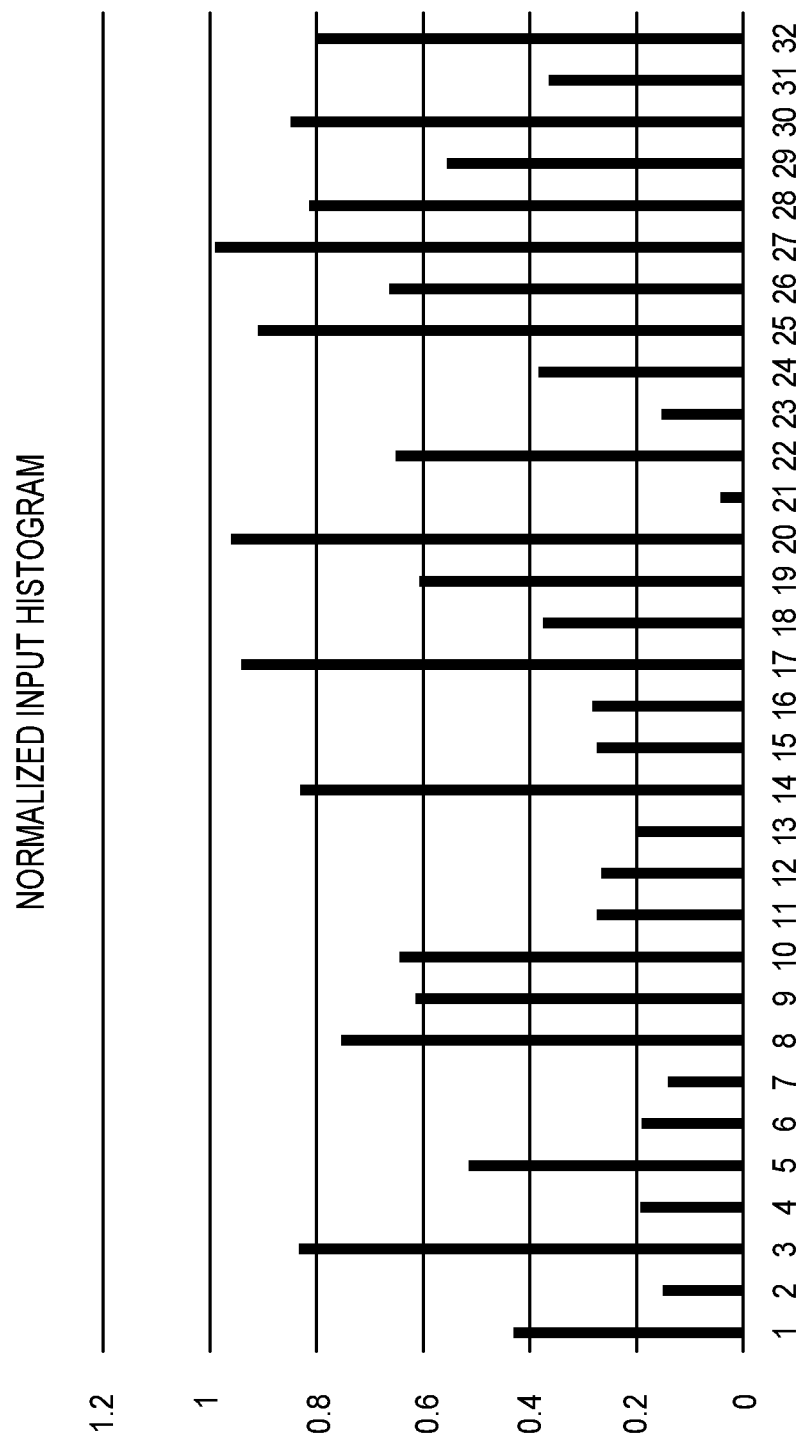
FIG. 4 is a diagram of a simplified example of an image histogram.

FIG. 4 is a diagram of a simplified example of an image histogram. In the example of FIG. 4, the bin values are from 1 to 32, corresponding to a 5 bit pixel depth. The density is normalized to a maximum value of 1.0 so that bin 27 has the highest density of 1.0. For a 7.5 megapixel image, the density of 1.0 might correspond to as many as a million observations or pixels with pixel value 27. In the same way bin 21 has a normalized density of about 0.03. This may correspond to hundreds or thousands of observations of the pixel value 21. The number of normalized observations will be directly related to the number of pixels in the image and the bit depth of each pixel.

Returning to FIG. 3 at 206 an intensity value or bin is selected that has the lowest density or count. With the bins sorted by intensity value, the absolute lowest density may be selected. With many bins, the bins may be divided into groups. Using such groups, the lowest density may be selected within each group. For a 20 bit pixel depth, there are over a million bins. The bins could be divided into a thousand groups of a thousand each or in any other desired way. The selecting may then be performed as selecting a bin with the lowest local density within the local range of bin values. In this example, there would be a thousand selections, one for each group. These selections may be performed in parallel for each group so that each group of one thousand bins is processed at the same time.

At 208, the pixels or occurrences of the selected bin are mapped to an adjacent bin to form a new single bin with the combined density. With the bins sorted based on pixel intensity value as mentioned above, an adjacent bin will have the next closest pixel intensity or bin value. Referring to FIG. 4, the lowest density bin is bin 21. The adjacent bins are bin 20 and bin 22. Either one of these adjacent bins is combined with the lowest bin 21. For simplicity the system may always select the intensity value just before or just after, or the system may randomly select the pixel intensity value that will be mapped.

Figure 6:
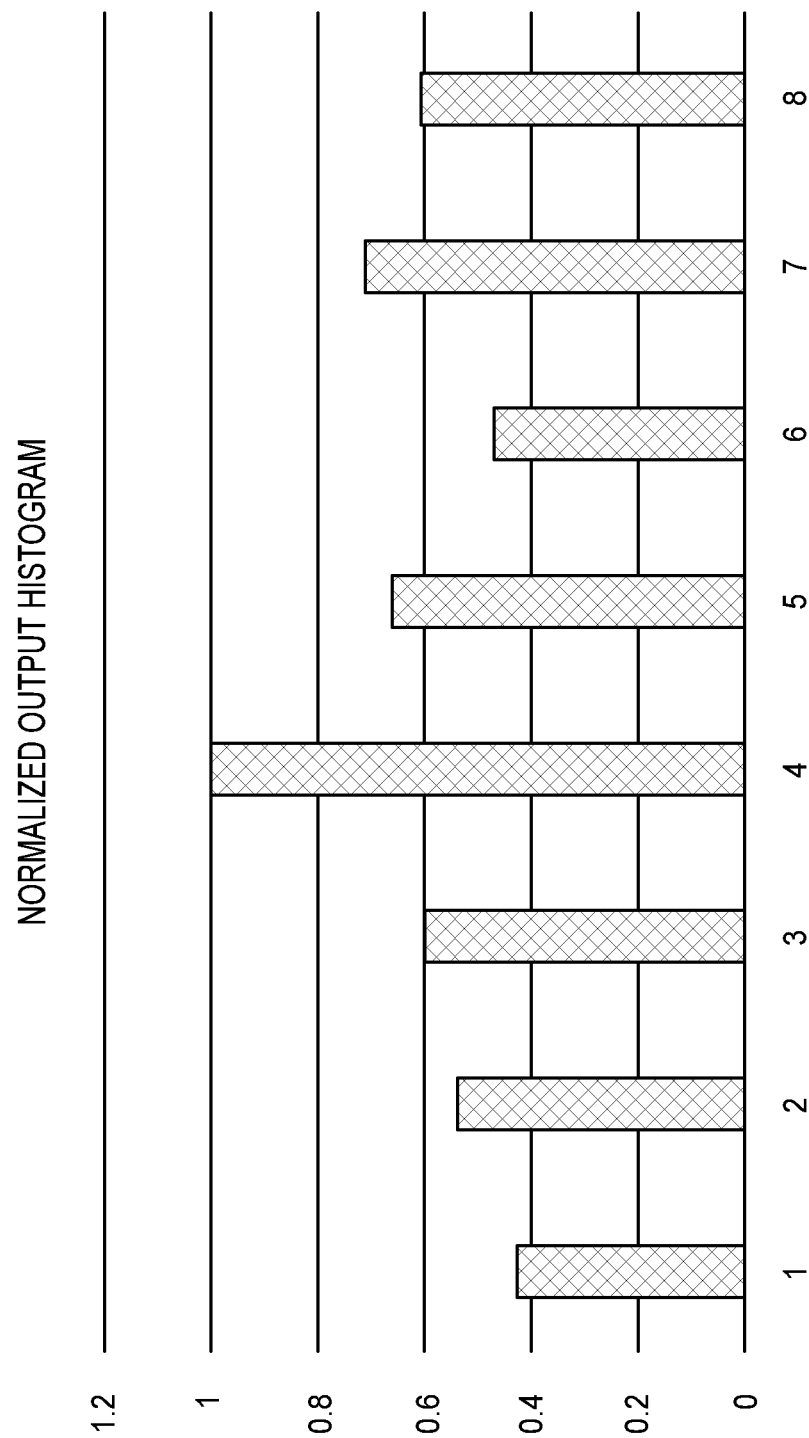
FIG. 6 is a diagram of a reduced bit depth image histogram according to an embodiment.

The mapping can be used as the start of a mapping function that will map all of the pixels to a different smaller number of different intensity values as shown in FIG. 6. At the start the mapping function is generated that combines the pixels of the pixel intensity value with the lowest count with pixels having an adjacent pixel intensity value into a single combined pixel intensity value. The mapping function may then be used to map the pixels accordingly.

A better but more difficult bin or intensity value selection is to select the adjacent bin with the lower density or count. As shown in FIG. 4, there are two adjacent bins, bin 20 and bin 22. The density of both identified adjacent bins are then compared. In this example, bin 20 has a normalized density of almost 1.0 while bin 22 has a normalized density of just over 0.6. Bin 22 is selected from the two identified adjacent bins because it has the lower density. The mapping function is updated to combine the selected bin and the selected identified adjacent bin to form a new single bin with the combined density. The mapping function is updated by adding this new combination mapping to the function.

In this particular example, the lowest density (e.g. about 0.04) corresponds to a bit value of 21. The two adjacent bin frequencies are 20 and 22. The bin for value 22 has a lower density (e.g. about 0.65) than that for 20 (e.g. about 0.95) so the pixels in bin 22 are combined with those in bin 21 and the new combined bin has a density of about 0.7. The histogram is reduced to 31 bins from 32 bins after bins 21 and 22 are combined.

For subsequent combinations, the new combined single bin may have a new bin value or use the bin value of one of the two original bins. The value for the new combined bin allows adjacent bins 20 and 23 to be identified. In the same way it allows the new bin to be identified as adjacent to bin 23 if bin 23 is selected as a lowest density bin. Accordingly, the combination includes assigning a bin value to the new bin. In one example, the bin value of the selected lowest density bin, e.g. 21, is assigned to the new bin. In another example, the value of the adjacent bin is selected, e.g. 22. In another example, the value of the bin is a value between the two, e.g. 21.5.

In another example, the next adjacent bins to each identified adjacent bin are identified and the lowest identified bin from among the adjacent bins and the next adjacent bins are selected. In the case of bin 21, the adjacent bins are bins 20 and 22 and the next adjacent bins are 19 and 23, respectively. Since bin 23 has a density of less than 0.2 and bin 19 has a density of over 0.6, bin 21 would be combined with bin 23 and not bin 22. In an example, the combination is achieved by creating a mapping function that maps multiple adjacent intensity values of the original image into the reduced number of intensity values in the output image.

This combining process repeats until the desired bit depth is achieved. The histogram of FIG. 4 has 32 possible gray values across the bottom horizontal axis and a normalized number of pixels on the vertical axis. The histogram represents a single frame although it may be a composite frame from an HDR or other process. In this simplified example, the camera produces each frame with 5 bits (32 values) per pixel. In FIG. 6, this frame data has been reduced to 8 possible gray values or 3 bits using the described approach. To reach the 8 bins result, the combining is repeated until there are only 8 bins remaining.

The sorting is described as being into histogram bins and the selecting is selecting bins, however, histogram bins is only one example of how the described mappings may be derived. In embodiments pixels are counted for each multiple bit pixel intensity value. The pixels having one value are then combined with pixels having an adjacent value into a new signal combined pixel intensity value. This new value is used to maintain the relative position of the new combination with respect to adjacent pixel intensity values.

At 210 after the first combination is made, the number of bins, e.g. 31 remaining after the combination is compared to the target number of bins or bit depth, e.g. 8. If the total is greater than the target, then the combination operations are repeated at 206. This continues until the target number of bins is reached.

For each repetition, a next pixel intensity value is selected with a lowest density after the last mapping of the pixels. An addition to the mapping function is generated to combine the pixels of the selected next pixel intensity value with pixels that have an adjacent pixel intensity value into another single combined pixel intensity value. The pixels are mapped according to the addition to the mapping function. The selecting of a next pixel intensity value with a lowest count, generating a next addition to the mapping function to combine the pixels of the selected next pixel intensity value with pixels having an adjacent pixel intensity value into another single combined pixel intensity value, and mapping the pixels according to the next addition are repeated until a total number of pixel intensity values is reduced to the predetermined number.

Upon reaching the target number of bins, the mapping function is applied to the original image to map it into the new, lower bit depth at 212. This generation of the mapping function can be visualized using FIGS. 4, 5, and 6. In that illustration, new sequential multiple bit pixel values can be assigned to each bin. In the illustrated example FIG. 4 is a histogram with 32 possible pixels values and FIG. 6 is a histogram of the same pixel data after 24 operations of combining bins has been completed so that there are 8 bins remaining. The bins are labeled 1 to 8 and 3-bit values from 0 to 7 may be used as pixel values for the pixels in each respective bin at 212. As mentioned above, the combining may be done to multiple groups simultaneously in which case, there is a target number of bins for each group.

These new pixel values may be used to generate a new image with a reduced bit depth using a mapping function based e.g. on this 8 bin histogram at 214. The resultant image data is then sent on at 216 for further processing and analysis. The reduced bit depth allows for faster transmission and faster processing and analysis with downstream equipment.

Figure 5:
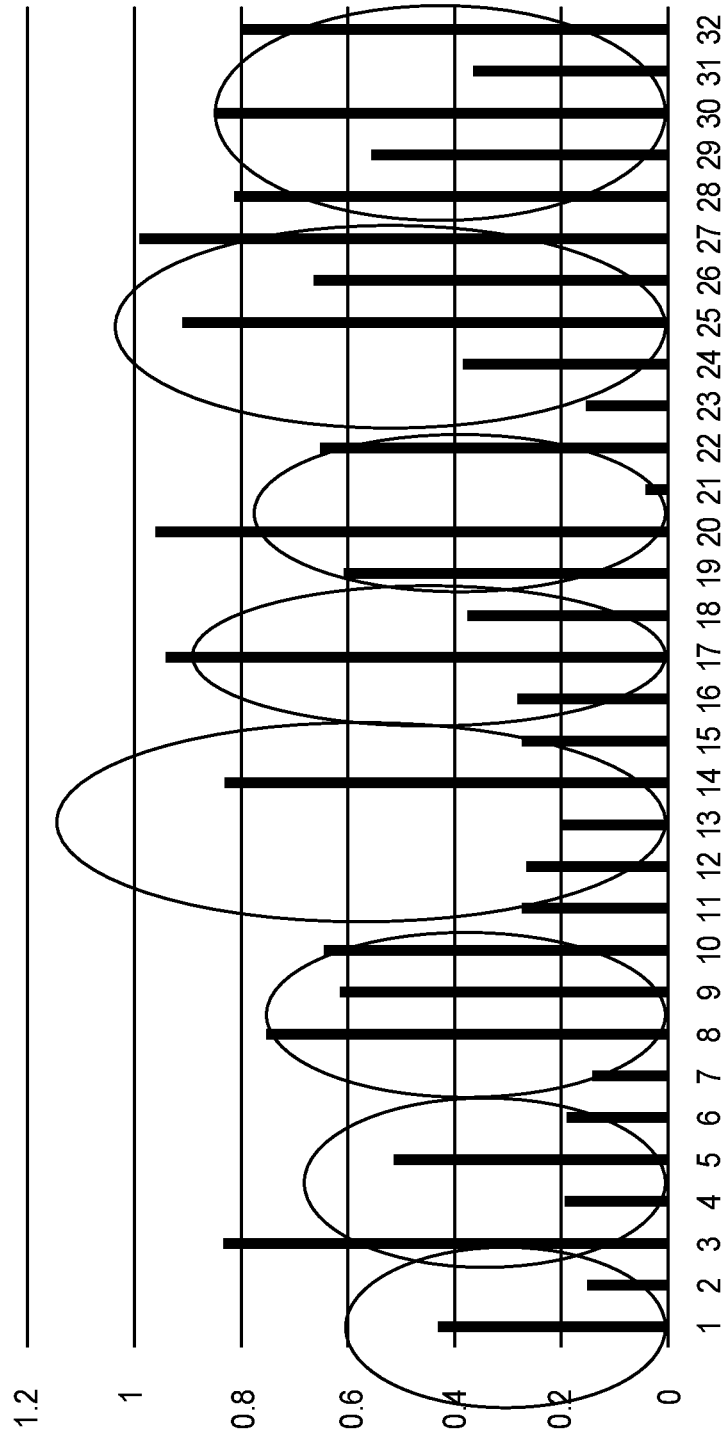
FIG. 5 is a diagram of an image histogram showing bins combination according to an embodiment.

FIG. 5 is a diagram of the histogram of FIG. 4 showing how the bins might be combined for the example values of FIG. 4. In FIG. 5, the same normalized bin densities are shown for each of the 32 bins. Circles are used to group adjacent bins. Accordingly, a circle combines bins 1 and 2. The mapping function in this example will map pixels with intensity values of 1 or 2 into an intensity value of 1 in the output image.

Another circle combines bins 3, 4, 5, and 6. The mapping function in this example will map pixels with values 3, 4, 5, and 6 into an intensity value of 2 in the output image.

Another circle combines bins 7, 8, 9, and 10 and those intensity values will be mapped into an intensity value of 3 in the output image.

Another circle combines bins 11, 12, 13, 14, and 15, and those intensity values will be mapped into an intensity value of 4 in the output image.

Another circle combines bins 15, 17, and 18, and those intensity values will be mapped into an intensity value of 5 in the output image.

Another circle combines bins 19, 20, 21, and 22, and those intensity values will be mapped into an intensity value of 6 in the output image.

Another circle combines bins 23, 24, 25, 26, and 27, and those intensity values will be mapped into an intensity value of 7 in the output image.

Another circle combines bins 28, 29, 30, 31, and 32, and those intensity values will be mapped into an intensity value of 8 in the output image.

A histogram of the reduced bit depth output image is shown in FIG. 6.

Each of the mappings discussed above are added to the mapping function so that a single mapping function maps each of the 32 bins to one of the final 8 bins to obtain the histogram of FIG. 6. The eight output bins each contain a combination of the original pixel intensity value bins. The particular combinations are determined by the repeated combination of two bins at a time until there are only eight single bins remaining.

In this example, some of the final output bins, such as the first bin 1, represents a combination of only two input bins, 1 and 2. Other output bins, such as bin 4 of FIG. 6 represent the combination of five bins of FIG. 5. Most of the output bins represent a combination of four input bins, but some represent more or fewer bins. By doing the combinations as described, the number of combined input bins is determined differently for different images. The result of selecting the bin with the lowest number of pixels is that pixel values representing less information are combined, while pixel values representing a larger amount of detail are not combined. The maximum amount of the information is maintained even though the total amount of data is greatly reduced.

The process above has been described in the context of building and sorting histograms. However, the data may be stored and maintained in different types of data structures. The size of histogram depends on its purpose and the sensor being used. At present, a high quality camera intended for use with an autonomous vehicle generates HDR frames at 8 MP with a 16-bit depth at a rate of 30 fps. The described process may be used with different cameras and for different applications, but such a camera is typical at present. The 8 MP sensor array determines the size or density of the histogram bins. The 16 bit pixel depth determines the number of histogram bins. The 30 FPS rate limits the maximum exposure time as does the number of exposures used to generate HDR images.

To optimally combine gray levels, a full, 16 bit histogram is generated; however, the bin size need not be the complete number of pixels. If, for example, the combining process is used to reduce 16 bit pixels to 8 bit pixels, a bin with 8 MP/255 is guaranteed to not be merged with another bin as there cannot be 254 bins with a greater number of pixels. Therefore the bin size can be limited to 15 bits. 15 bits by 64 k bins is still a large number of registers so this process is likely to be implemented in memory rather than with flip flops.

Figure 7:
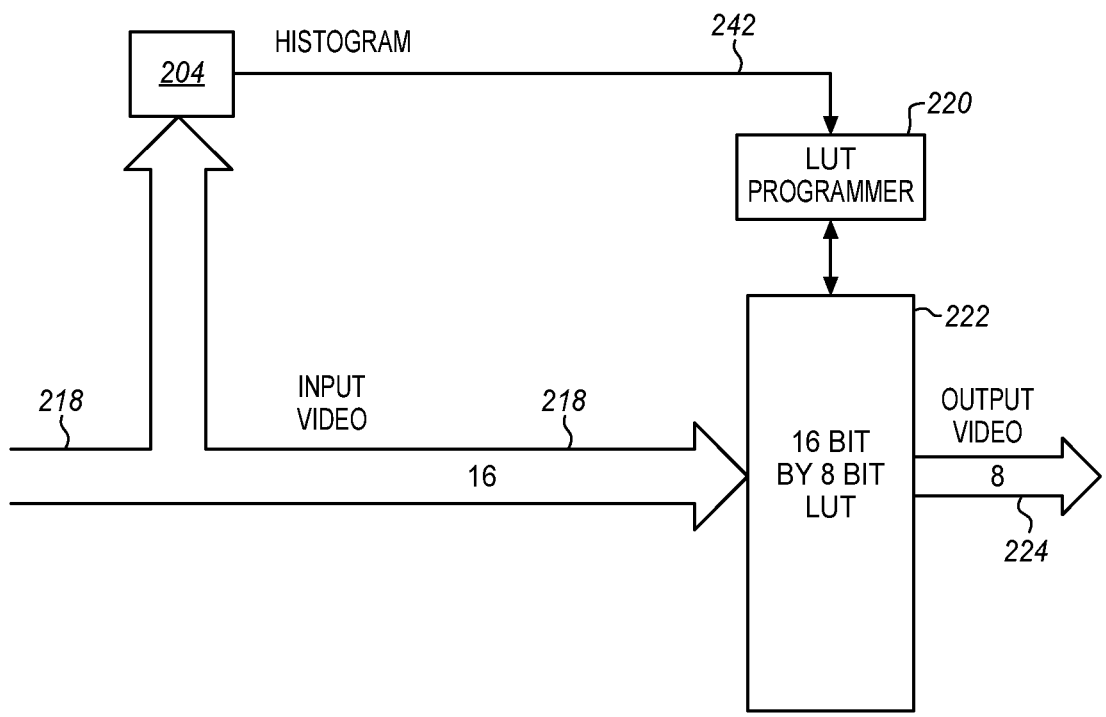
FIG. 7 is a diagram of an apparatus for reducing the bit depth of video images using a lookup table according to an embodiment.

FIG. 7 is a diagram of an apparatus for reducing the bit depth of a video using a lookup table (LUT). In embodiments, a video stream 218, such as a 16-bit color visible light video stream, although the invention is not so limited, is fed as in input into a LUT 222. The LUT is a 16 bit by 8 bit LUT in which each 16 bit pixel value is mapped to an 8 bit pixel value. Accordingly many 16 bit values are mapped to the same 8 bit value. An output 8 bit video 224 is generated based on the mappings in the mapping function which is then provided to or fed to a video analysis or processing system. The 8 bit video has a much lower data rate than the 16 bit video and is easier to transmit and process.

The values of the LUT are modified for each frame or after some predetermined number of frames. The values in the LUT are provided by a LUT programmer 220 which feeds new values into the table after each frame or after some predetermined number of frames. The LUT programmer receives a histogram 242 from a histogram calculator 240. The histogram calculator also receives the incoming video 218. The histogram calculator determines an input e.g. 16 bit histogram and then generates a corresponding mapping table using combinations as mentioned above. The mapping table 242 is sent to the LUT programmer 220 to program the LUT.

While the description above is presented in the context of individual frames, in many implementations, the image input will be as a video sequence of frames. The multiple images are very useful for determining motion of objects in the scene. While the positions of at least some of the objects change quickly from frame-to-frame, the colors are often the same across many frames. Accordingly, it may not be necessary to determine a new reduced bit depth, e.g. 8 bit, histogram for each frame. The colors of the frames of the video will change more slowly and a reduced bit depth histogram from one frame in many circumstances will be suitable for use with 10 to 100 or more subsequent frames in the sequence, depending on the circumstances. The LUT programmer 220, for example, may receive a new reduced bit depth histogram only after some number of frames has been processed. The programmer will then reprogram the LUT at some rate that is slower than the video frame rate.

Self-driving or "autonomous" vehicles generally employ sensors, such as light detection and ranging (lidar) devices, to detect or "see" the surrounding environment as the vehicles move toward their destinations. Such vehicles include self-driving control systems that process the sensor data and, based on both the sensed environment and the desired destination, determine which maneuvers and operational states (e.g., speed, braking force, steering direction) are most appropriate on a more or less continuous basis throughout the trip. The principles and systems described herein may be applied to self-driving or autonomous vehicles among other uses. The systems described below show additional details of the systems above including more detail for some of the systems and alternatives to some of the systems above. The features of these systems may be combined in various ways to suit particular applications.

Figure 8:
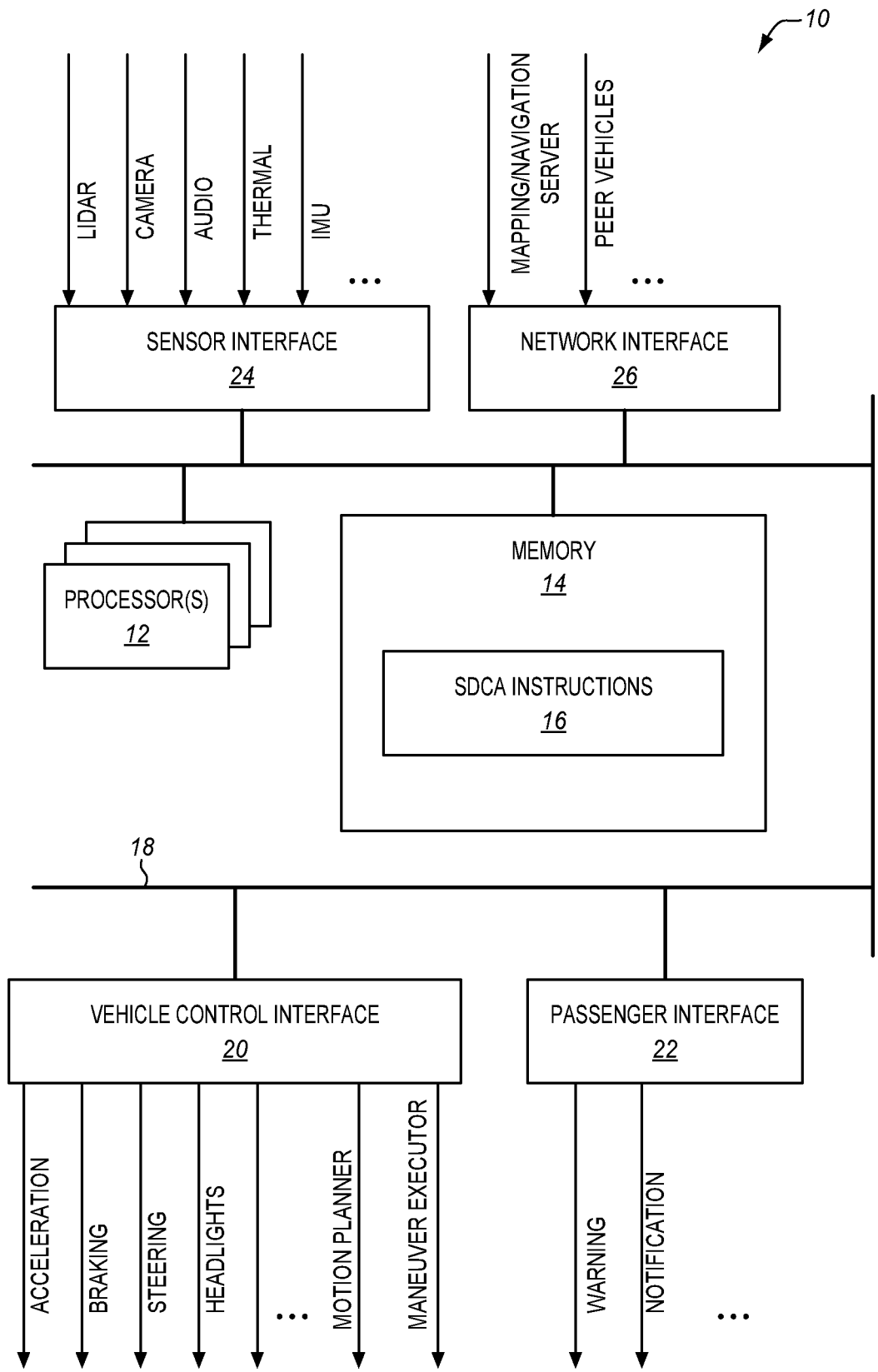
FIG. 8 is block diagram of an example computing system for controlling and/or operating an autonomous vehicle.

FIG. 8 includes a block diagram of an example computing system 10 for controlling and/operating an autonomous vehicle. The computing system 10 may be integrated within an autonomous vehicle in any suitable manner, and at any suitable location or locations within the vehicle. For example, the computing system 10 may be included, or partially included, within a vehicle controller that is onboard an autonomous vehicle, where the vehicle controller controls and/or operates at least some of the vehicle's driving subsystems that include mechanical components (e.g., accelerator, brakes, steering mechanism, lights, etc.) in a fully- or semi-autonomous manner. The computing system 10 includes one or more processors 12 and one or more tangible, non-transitory memories 14 storing thereon vehicle subsystem control and/or operation instructions 16, which are referred to herein as self-driving control architecture ("SDCA") instructions 16. Generally speaking, the SDCA instructions 16 generate decisions for controlling various operations, behaviors, and maneuvers of the autonomous vehicle.

In embodiments where the processor(s) 12 include more than a single processor, each processor may be a different programmable microprocessor that executes software instructions stored in the memory 14. Alternatively, each of the processor(s) 12 may be a different set of such microprocessors, or a set that includes one or more microprocessors and one or more other processor types (e.g., ASICs, FPGAs, etc.) for certain functions.

The memory 14 may include one or more physical memory devices with non-volatile memory. Any suitable memory type or types may be used, such as ROM, solid-state drives (SSDs), hard disk drives (HDDs), and so on. The processor(s) 12 are coupled to the memory 14 via a bus or other network 18. The network 18 may be a single wired network or may include any suitable number of wired and/or wireless networks. For example, the network 18 may be or include a controller area network (CAN) bus, a Local Interconnect Network (LIN) bus, and so on.

Also coupled to the network 18 are a vehicle control interface 20, a passenger interface 22, a sensor interface 24, and a network interface 26. Each of the interfaces 20, 22, 24 and 26 may include one or more processors (e.g., ASICs, FPGAs, microprocessors, etc.) and/or other hardware, firmware and/or software to enable communication with systems, subsystems, devices, etc., that are external to the computing system 10.

The vehicle control interface 20 is generally configured to provide control data generated by the processor(s) 12 executing the SDCA instructions 16 to the appropriate operational subsystems of the autonomous vehicle, such that the appropriate subsystems can effectuate driving decisions made by the processor(s) 12. For example, the vehicle control interface 20 may provide control signals to the appropriate driving-related subsystem(s) that include mechanical components, e.g., accelerator, brakes, steering mechanism, lights, etc. As another example, the vehicle control interface 20 may output signals to appropriate subsystem(s) that plan the motion of the vehicle (e.g., a motion planner), and/or that control the execution of driving maneuvers (e.g., a maneuver executor). In some embodiments, the vehicle control interface 20 includes separate interface hardware, firmware and/or software for different operational subsystems.

The passenger interface 22 is generally configured to provide alerts, warnings, notifications, and/or other information to one or more passengers of the autonomous vehicle. In some embodiments where the vehicle is not fully autonomous (e.g., allowing human driving in certain modes and/or situations), the interface 22 may specifically provide such information to the driver (e.g., via dashboard indicators, etc.). As just one example, the passenger interface 22 may cause a display and/or speaker in the vehicle to generate an alert when the processor(s) 12 (executing the SDCA instructions 16) determine that a collision with another object is likely. As another example, the passenger interface 22 may cause a display in the vehicle to show an estimated time of arrival (ETA) to passengers. In some embodiments, the passenger interface 22 also permits certain user inputs. If the vehicle supports passenger selection of specific driving styles, for example, the passenger interface 22 may cause a display to present a virtual control (e.g., button) that a passenger may activate (e.g., touch, scroll through, etc.) to select a particular driving style.

The sensor interface 24 is generally configured to convert raw sensor data obtained by one or more sensor devices (e.g., lidar, camera, microphones, thermal imaging units, IMUs, etc.) to a format that is consistent with a protocol of the network 18 and that is recognized by one or more of the processor(s) 12. The sensor interface 24 may be coupled to an on-board lidar system and/or other type of active sensing system, for example, with the sensor interface 24 converting point cloud data generated by such system(s) into an appropriate format. In some embodiments, the sensor interface 24 includes separate interface hardware, firmware and/or software for each sensor device and/or each sensor type.

The network interface 26 is generally configured to convert data received from one or more devices or systems external to the autonomous vehicle to a format that is consistent with a protocol of the network 18 and is recognized by one or more of the processor(s) 12. In some embodiments, the network interface 26 includes separate interface hardware, firmware and/or software for different external sources. For example, a remote mapping/navigation server may send mapping and navigation/route data (e.g., mapping and navigation signals) to the computing system 10 via a first type of wireless network interface included in the network interface 26, e.g., a cellular network interface, while one or more peer vehicles (e.g., other autonomous vehicles) may send data (e.g., current positions of the other vehicles) to the computing system 10 via a different type of wireless network interface included in the network interface 26, e.g., a Wi Fi network interface. Other types of external data may also, or instead, be received via the network interface 26. For example, the computing system 10 may use the network interface 26 to receive data representing rules or regulations (e.g., speed limits), object positions (e.g., road rails, overhanging signage, etc.), and/or other information from various infrastructure devices or systems.

In some embodiments, no sensor data (or only limited sensor data) of the autonomous vehicle is received via the sensor interface 24. Instead, the processor(s) 12 executes the SDCA instructions 16 using, as input, only (or primarily) data that is received by the network interface 26 from other vehicles, infrastructure, and/or other external devices/systems. In such an embodiment, the external data may include raw sensor data that is indicative of the vehicle environment (but was generated off-board the vehicle), and/or may include higher-level information that was generated externally using raw sensor data (e.g., occupancy grids).

Although not illustrated in FIG. 8, the network 18 may also couple to other types of interfaces and/or components. Additionally, in some embodiments, one or more of the interfaces shown in FIG. 8 may be omitted (e.g., the sensor interface 14, as discussed above). Moreover, it is understood that the computing system 10 represents just one possible configuration for supporting the software architectures, functions, features, etc., described herein, and that others are also within the scope of this disclosure.

Figure 9:
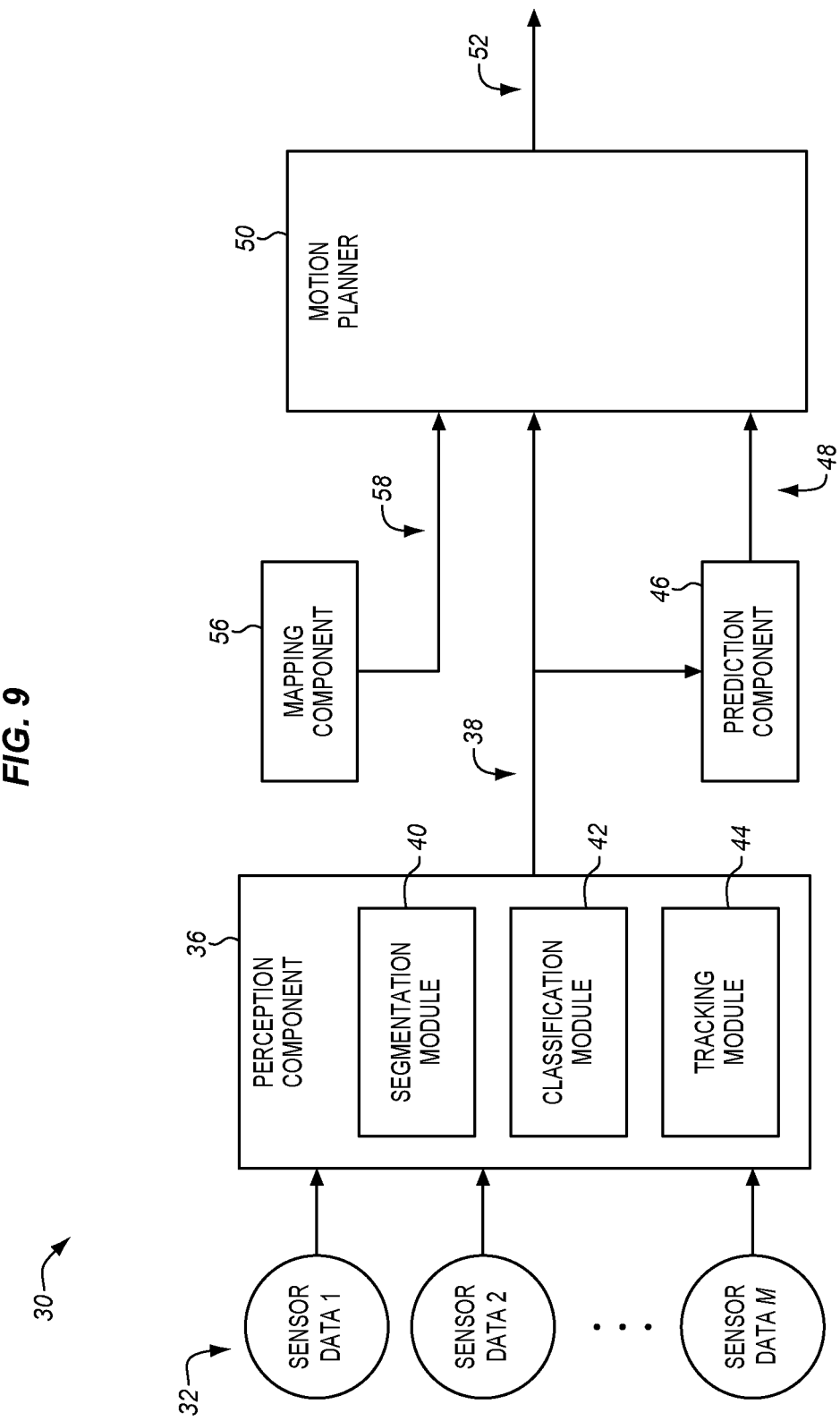
FIG. 9 is a block diagram of an example self-driving control architecture (SDCA) of an autonomous vehicle.

FIG. 9 illustrates an example self-driving control architecture (SDCA) 30 of an autonomous vehicle. Generally speaking, a SDCA 30 may generate instructions for controlling various operations and maneuvers of an autonomous vehicle. The SDCA 30 may be implemented by the SDCA instructions 16 of FIG. 8, in an embodiment. The SDCA 30 receives as input M sets of sensor data 32 generated by M different sensors, with M being any suitable integer equal to or greater than one. The sensor data 32 may be received via the sensor interface 24 of FIG. 8, in an embodiment. As just one example, "sensor data 1" may include frames of point cloud data generated by a first lidar device, "sensor data 2" may include frames of point cloud data generated by a second lidar device, "sensor data 3" (as indicated by the ellipsis) may include frames of digital images generated by a camera, and so on. As discussed above with respect to FIG. 8, the sensors may include one or more lidar devices, cameras, radar devices, thermal imaging units, IMUs, and/or other sensor types. Generally speaking, the SDCA 30 is configured to process point cloud data and, in some embodiments, is also configured to process two-dimensional image data, such as camera data.

The sensor data 32 is input to a perception component 36 of the SDCA 30, and is processed by the perception component 36 to generate perception signals 38 descriptive of a current state of the environment in which the autonomous vehicle is located. It is understood that the term "current" may actually refer to a very short time prior to the generation of any given perception signals 38, e.g., due to the short processing delay introduced by the perception component 36 and other factors. To generate the perception signals, the perception component may include a segmentation module 40, a classification module 42, and a tracking module 44.

The segmentation module 40 is generally configured to identify distinct objects within the sensor data representing the sensed environment. Depending on the embodiment and/or scenario, the segmentation task may be performed separately for each of a number of different types of sensor data, or may be performed jointly on a fusion of multiple types of sensor data. In some embodiments where lidar devices are used, the segmentation module 40 analyzes frames that include point cloud datasets therein to identify subsets of points within each frame that correspond to probable physical objects located in the environment. In other embodiments, the segmentation module 40 jointly analyzes lidar point cloud data frames in conjunction with camera image frames to identify objects that are located in the environment. Other suitable techniques, and/or data from other suitable sensor types, may also be used to identify objects. It is noted that, as used herein, references to different or distinct "objects" may encompass physical things that are entirely disconnected (e.g., with two vehicles being two different "objects," and the road on which the vehicles are traveling as yet a different "object"), as well as physical things that are connected or partially connected (e.g., with a vehicle being a first "object" and the vehicle's hitched trailer being a second "object"). The segmentation module 40 may use predetermined rules or algorithms to identify objects. For example, the segmentation module 40 may identify as distinct objects, within a point cloud, any clusters of points that meet certain criteria (e.g., having no more than a certain maximum distance between the points in the cluster, or having the same relative velocity). As another example, the segmentation module 40 may utilize one or more neural networks that have been trained to identify distinct objects within the environment (e.g., using supervised learning with generated labels for different objects within test data point clouds, etc.), or may utilize one or more other types of machine-learning based models that have been trained, by using test or training data, to discern, distinguish, and/or identify probably distinct objects within a source image.

The classification module 42 is generally configured to determine classes (labels, categories, etc.) for different objects that have been identified or distinguished by the segmentation module 40. Like the segmentation module 40, the classification module 42 may perform classification separately for different sets of the sensor data 32, or may classify objects based on data from multiple sensors, etc. Moreover, and also similar to the segmentation module 40, the classification module 42 may utilize one or more neural networks or other machine-learning based models to classify objects, where the neural networks and/or machine-learning models have been trained, by using a set of test or training data, to perform object classification.

The tracking module 44 is generally configured to track distinct objects over time (e.g., across multiple lidar point cloud or camera image frames). The tracked objects are generally objects that have been identified by the segmentation module 40, but may or may not be objects that were classified by the classification module 42, depending on the embodiment and/or scenario. The segmentation module 40 may assign identifiers to identified objects, and the tracking module 44 may associate existing identifiers with specific objects where appropriate (e.g., for lidar data, by associating the same identifier with different clusters of points, at different locations, in successive point cloud frames). Like the segmentation module 40 and the classification module 42, the tracking module 44 may perform separate object tracking based on different sets of the sensor data 32, or may track objects based on data from multiple sensors. Moreover, and also similar to the segmentation module 40 and the classification module 42, the tracking module 44 may utilize one or more neural networks or other machine-learning models to track objects, where the neural networks and/or machine-learning models have been trained, by using a set of test or training data, to perform object tracking across frames and/or images.

The SDCA 30 also includes a prediction component 46, which processes the perception signals 38 to generate prediction signals 48 descriptive of one or more predicted future states of the autonomous vehicle's environment. For a given object, for example, the prediction component 46 may analyze the type/class of the object (as determined by the classification module 42) along with the recent tracked movement of the object (as determined by the tracking module 44) to predict one or more future positions of the object. As a relatively simple example, the prediction component 46 may assume that any moving objects will continue to travel on their current direction and with their current speed, possibly taking into account first- or higher-order derivatives to better track objects that have continuously changing directions, objects that are accelerating, and so on. In some embodiments, the prediction component 46 also predicts movement of objects based on more complex behaviors. For example, the prediction component 46 may assume that an object that has been classified as another vehicle will follow rules of the road (e.g., stop when approaching a red light), and will react in a certain way to other dynamic objects (e.g., attempt to maintain some safe distance from other vehicles). The prediction component 46 may inherently account for such behaviors by utilizing a neural network or other machine learning model, for example. The prediction component 46 may be omitted from the SDCA 30, in some embodiments.

In some embodiments, the perception signals 38 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 42, possibly with an "unknown" class for certain pixels that were not successfully classified. Similarly, the prediction signals 48 may include, for each such grid generated by the perception component 36, one or more "future occupancy grids" that indicate predicted object positions, boundaries and/or orientations at one or more future times (e.g., 1, 2 and 5 seconds ahead).

A mapping component 56 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 58. In some embodiments, the mapping and navigation signals 58 include other map- or location-related information, such as speed limits, traffic indicators, and so on. The signals 58 may be obtained from a remote server (e.g., via a cellular or other communication network of the autonomous vehicle, or of a smartphone coupled to the autonomous vehicle, etc.), and/or may be locally stored in a persistent memory of the autonomous vehicle.

A motion planner 50 processes the perception signals 38, the prediction signals 48, and the mapping and navigation signals 58 to generate decisions 52 regarding the next movements of the autonomous vehicle. Depending on the type of the motion planner 50, the decisions 52 may include operational parameters (e.g., braking, speed and steering parameters) and/or particular maneuvers (e.g., turn left, move to right lane, move onto shoulder of road, etc.). The decisions 52 may be provided to one or more operational subsystems of the autonomous vehicle (e.g., if the decisions 52 indicate specific operational parameters for subsystems that include mechanical components, such as steering mechanisms, accelerator, brakes, lights, etc.), or may be provided to one or more intermediate stages that convert the decisions 52 into operational parameters (e.g., if the decisions indicate specific maneuvers to be performed by a maneuver executor).

The motion planner 50 may utilize any suitable type(s) of rules, algorithms, heuristic models, machine learning models, or other suitable techniques to make driving decisions based on the perception signals 38, prediction signals 48, and mapping and navigation signals 58. For example, the motion planner 50 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on. In some embodiments, the motion planner 50 includes multiple, different motion planner types in order to provide a more diverse set of mechanisms for generating driving decisions, and thereby improve safety and/or other performance aspects of the autonomous vehicle.

Light detection and ranging (lidar) is a technology that can be used to measure distances to remote targets. Typically, a lidar system includes a light source and an optical receiver. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

Figure 10:
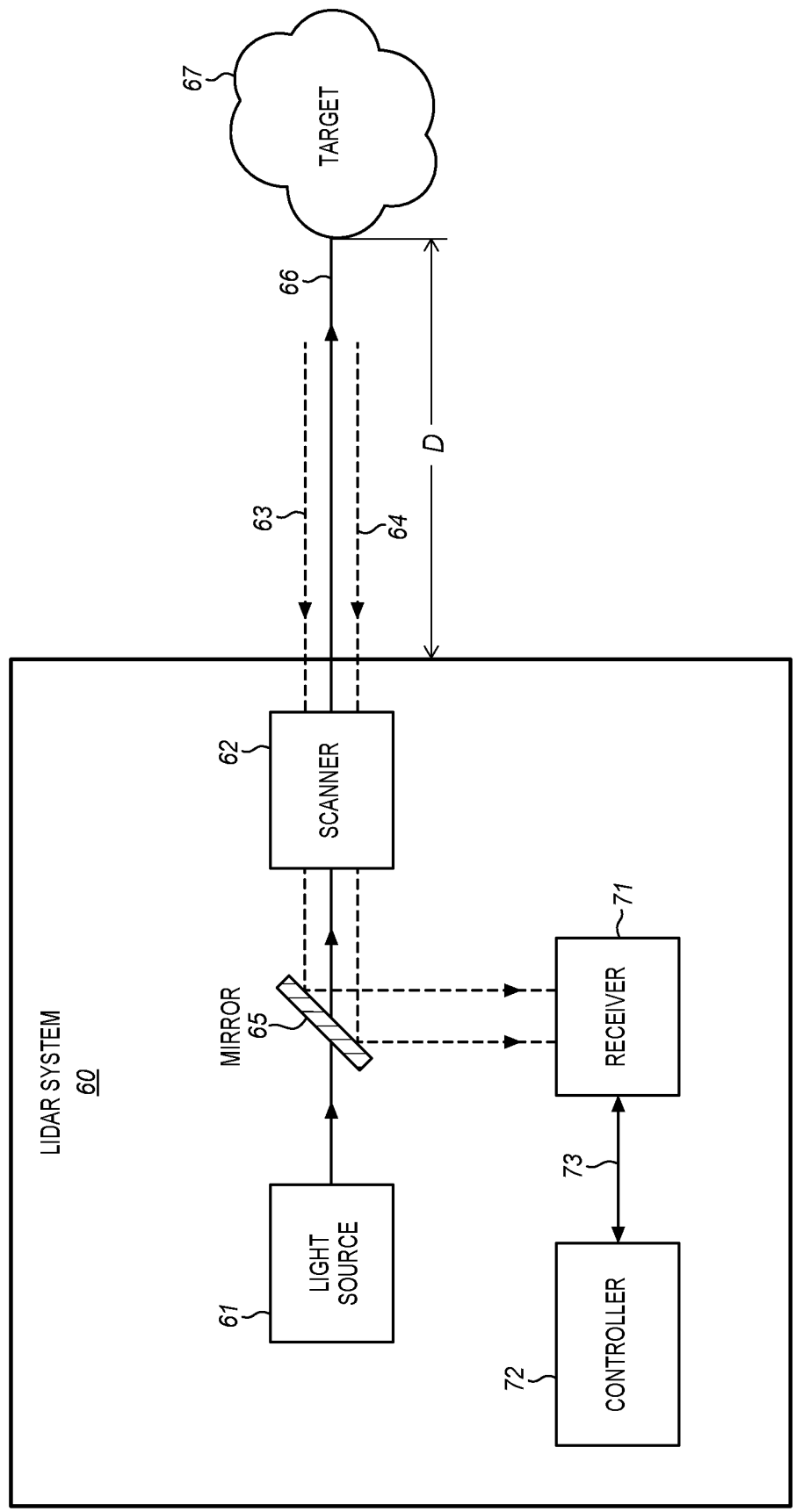
FIG. 10 is a block diagram of an example light detection and ranging (lidar) system.

FIG. 10 illustrates an example light detection and ranging (lidar) system 60. In particular embodiments, a lidar system 60 may include a light source 61, mirror 65, scanner 62, receiver 71, or controller 72. The light source 61 may include, for example, a laser which emits light having a particular operating wavelength in the infrared, visible, or ultraviolet portions of the electromagnetic spectrum. The light source 61 emits an output beam of light 66 which may be continuous wave (CW), pulsed, or modulated in any suitable manner for a given application. The output beam of light 66 is directed downrange toward a remote target 67.

Once the output beam 66 reaches the downrange target 67, the target may scatter or reflect at least a portion of light from the output beam 66, and some of the scattered or reflected light may return toward the lidar system 60. In the example of FIG. 10, the scattered or reflected light is represented by input beam 63, 64 which passes through scanner 62 and is reflected by mirror 65 and directed to receiver 71. In particular embodiments, a relatively small fraction of the light from output beam 66 may return to the lidar system 60 as input beam 63, 64.

In particular embodiments, receiver 71 may receive or detect photons from input beam 63, 64 and generate one or more representative signals. For example, the receiver 71 may generate an output electrical signal 73 that is representative of the input beam 63, 64 and the electrical signal 73 may be sent to controller 72. In particular embodiments, receiver 71 or controller 72 may include a processor, computing system (e.g., an ASIC or FPGA), or other suitable circuitry. A controller 72 may be configured to analyze one or more characteristics of the electrical signal 73 from the receiver 71 to determine one or more characteristics of the target 67, such as its distance downrange from the lidar system 60. This can be done, for example, by analyzing the time of flight or phase modulation for a beam of light 66 transmitted by the light source 61. If lidar system 60 measures a time of flight of T (e.g., T represents a round-trip time of flight for an emitted pulse of light to travel from the lidar system 60 to the target 67 and back to the lidar system 60), then the distance D from the target 67 to the lidar system 100 may be expressed as D=c·T/2, where c is the speed of light (approximately 3.0×108 m/s).

In particular embodiments, lidar system 60 may include a scanner 62 configured to scan an output beam 66 across a field of regard of the lidar system 60. As an example, scanner 62 may include one or more scanning mirrors configured to pivot, rotate, oscillate, or move in an angular manner about one or more rotation axes. The output beam 66 may be reflected by a scanning minor, and as the scanning minor pivots or rotates, the reflected output beam 66 may be scanned in a corresponding angular manner.

In particular embodiments, a scanning mirror may be attached to a scanner actuator or mechanism which pivots or rotates the minor over a particular angular range. A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism.

In particular embodiments, scanner 62 may be configured to scan the output beam 66 (which may include at least a portion of the light emitted by light source 61) across a field of regard of the lidar system 60. A field of regard (FOR) of a lidar system 60 may refer to an area, region, or angular range over which the lidar system 60 may be configured to scan or capture distance information. In other embodiments, scanner 62 may be configured to direct the output beam 66 towards specific points in the FOR rather than scanning the output beam across the entire FOR, reducing the number of points captured by the lidar system.

In particular embodiments, a lidar system 60 may be used to determine the distance to one or more downrange targets 67. By scanning the lidar system 60 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. In particular embodiments, lidar system 60 may be configured to repeatedly capture or generate point clouds of a field of regard at any suitable frame rate. In particular embodiments, a point-cloud frame rate may be substantially fixed, or a point-cloud frame rate may be dynamically adjustable.

Although this disclosure describes or illustrates example embodiments of lidar systems 60 or light sources 61 that produce light waveforms that include pulses of light, the embodiments described or illustrated herein may also be applied to other types of light waveforms, including continuous-wave (CW) light or modulated light waveforms. For example, a lidar system 60 as described or illustrated herein may include a light source 61 configured to produce pulses of light. Alternatively, a lidar system 60 may be configured to act as a frequency-modulated continuous-wave (FMCW) lidar system and may include a light source 61 configured to produce CW light or a frequency-modulated light waveform.

Although FIG. 10 utilizes one or more scanning mirrors to target the output beam, other embodiments of lidar system 60 may be used. In particular embodiments, lidar system 60 may be a flash lidar that captures an entire FOR with a single laser flash. In other embodiments, lidar system 60 may use lasers that are coupled to a mechanically rotating platform.

Figure 11:
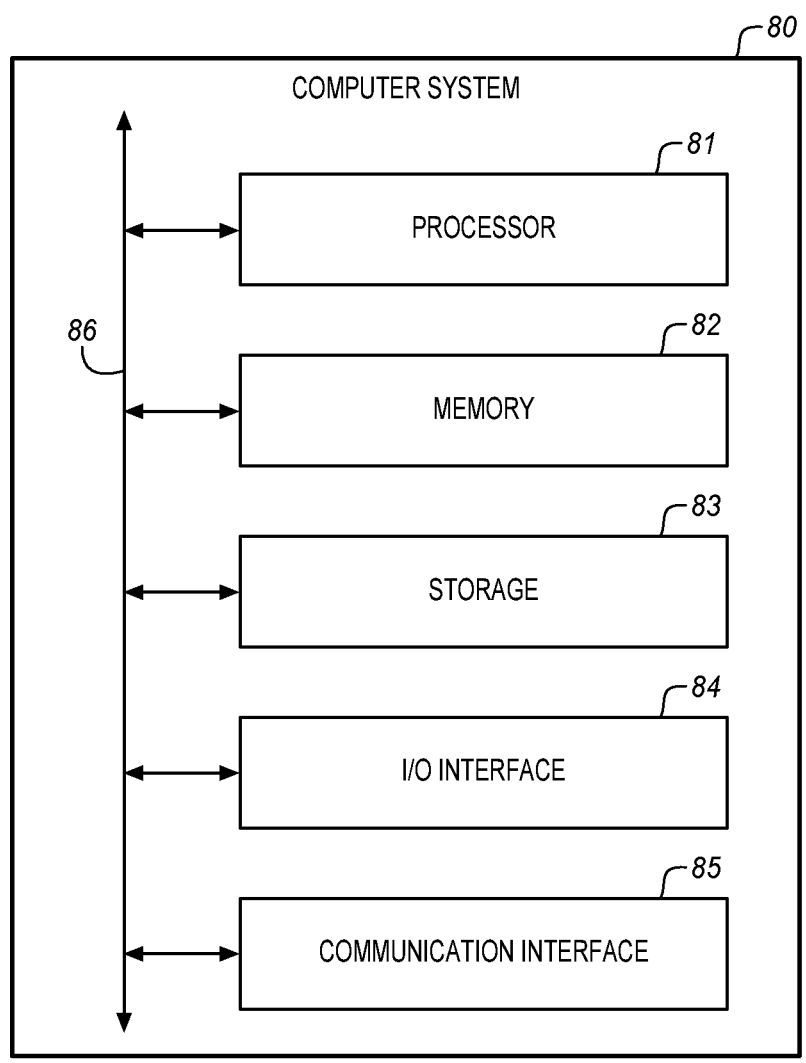
FIG. 11 is a block diagram of an example computer system.

FIG. 11 illustrates an example computer system 80. In particular embodiments, one or more computer systems 80 may perform one or more steps of one or more methods described or illustrated herein. In particular embodiments, one or more computer systems 80 may provide functionality described or illustrated herein. In particular embodiments, software running on one or more computer systems 80 may perform one or more steps of one or more methods described or illustrated herein or may provide functionality described or illustrated herein. Particular embodiments may include one or more portions of one or more computer systems 80. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 80 may take any suitable physical form. As an example, computer system 80 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 80 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 80 may include one or more computer systems 80; be unitary or distributed; span multiple locations; span multiple machines; span multiple data centers; or reside in a cloud, which may include one or more cloud components in one or more networks. Where appropriate, one or more computer systems 80 may perform without substantial spatial or temporal limitation one or more steps of one or more methods described or illustrated herein. As an example, one or more computer systems 80 may perform in real time or in batch mode one or more steps of one or more methods described or illustrated herein. One or more computer systems 80 may perform at different times or at different locations one or more steps of one or more methods described or illustrated herein, where appropriate.

As illustrated in the example of FIG. 11 computer system 80 may include a processor 81, memory 82, storage 83, an input/output (I/O) interface 84, a communication interface 85, or a bus 86. Computer system 80 may include any suitable number of any suitable components in any suitable arrangement.

In particular embodiments, processor 81 may include hardware for executing instructions, such as those making up a computer program. As an example, to execute instructions, processor 81 may retrieve (or fetch) the instructions from an internal register, an internal cache, memory 82, or storage 83; decode and execute them; and then write one or more results to an internal register, an internal cache, memory 82, or storage 83. In particular embodiments, processor 81 may include one or more internal caches for data, instructions, or addresses. Processor 81 may include any suitable number of any suitable internal caches, where appropriate. As an example, processor 81 may include one or more instruction caches, one or more data caches, or one or more translation lookaside buffers (TLBs). Instructions in the instruction caches may be copies of instructions in memory 82 or storage 83, and the instruction caches may speed up retrieval of those instructions by processor 81. Data in the data caches may be copies of data in memory 82 or storage 83 for instructions executing at processor 81 to operate on; the results of previous instructions executed at processor 81 for access by subsequent instructions executing at processor 81 or for writing to memory 82 or storage 83; or other suitable data. The data caches may speed up read or write operations by processor 81. The TLBs may speed up virtual-address translation for processor 81. In particular embodiments, processor 81 may include one or more internal registers for data, instructions, or addresses. Processor 81 may include any suitable number of any suitable internal registers, where appropriate. Where appropriate, processor 81 may include one or more arithmetic logic units (ALUs); may be a multi-core processor; or may include one or more processors 81. In particular embodiments, processor 81 may be a general-purpose single- or multi-chip processor, a digital signal processor (DSP), an ASIC, a FPGA, any other suitable programmable-logic device, discrete gate or transistor logic, discrete hardware components, or any suitable combination thereof.

In particular embodiments, memory 82 may include main memory for storing instructions for processor 81 to execute or data for processor 81 to operate on. As an example, computer system 80 may load instructions from storage 83 or another source (such as, for example, another computer system 80) to memory 82. Processor 81 may then load the instructions from memory 82 to an internal register or internal cache. To execute the instructions, processor 81 may retrieve the instructions from the internal register or internal cache and decode them. During or after execution of the instructions, processor 81 may write one or more results (which may be intermediate or final results) to the internal register or internal cache. Processor 81 may then write one or more of those results to memory 82. One or more memory buses (which may each include an address bus and a data bus) may couple processor 81 to memory 82. Bus 86 may include one or more memory buses. In particular embodiments, one or more memory management units (MMUs) may reside between processor 81 and memory 82 and facilitate accesses to memory 82 requested by processor 81. In particular embodiments, memory 82 may include random access memory (RAM). This RAM may be volatile memory, where appropriate. Where appropriate, this RAM may be dynamic RAM (DRAM) or static RAM (SRAM). Memory 82 may include one or more memories 82, where appropriate.

In particular embodiments, storage 83 may include mass storage for data or instructions. As an example, storage 83 may include a hard disk drive (HDD), a floppy disk drive, flash memory, an optical disc, a magneto-optical disc, magnetic tape, or a Universal Serial Bus (USB) drive or a combination of two or more of these. Storage 83 may include removable or non-removable (or fixed) media, where appropriate. Storage 83 may be internal or external to computer system 80, where appropriate. In particular embodiments, storage 83 may be non-volatile, solid-state memory. In particular embodiments, storage 83 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 83 may include one or more storage control units facilitating communication between processor 81 and storage 83, where appropriate. Where appropriate, storage 83 may include one or more storages 83.

In particular embodiments, I/O interface 84 may include hardware, software, or both, providing one or more interfaces for communication between computer system 80 and one or more I/O devices. Computer system 80 may include one or more of these I/O devices, where appropriate. One or more of these I/O devices may enable communication between a person and computer system 80. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 84 may include one or more device or software drivers enabling processor 81 to drive one or more of these I/O devices. I/O interface 84 may include one or more I/O interfaces 84, where appropriate.

In particular embodiments, communication interface 85 may include hardware, software, or both providing one or more interfaces for communication (such as, for example, packet-based communication) between computer system 80 and one or more other computer systems 80 or one or more networks. As an example, communication interface 85 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 80 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 80 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 80 may communicate using fiber-optic communication based on 100 Gigabit Ethernet (100 GbE), 10 Gigabit Ethernet (10 GbE), or Synchronous Optical Networking (SONET). Computer system 80 may include any suitable communication interface 85 for any of these networks, where appropriate. Communication interface 85 may include one or more communication interfaces 85, where appropriate.

In particular embodiments, bus 86 may include hardware, software, or both coupling components of computer system 80 to each other. As an example, bus 86 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 86 may include one or more buses 86, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 80. As an example, computer software may include instructions configured to be executed by processor 81. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately," "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

As used herein, the terms "coupled," "couple," "coupling" and similar terms may be used to describe or present a direct physical connection without any intermediate components or may refer to a connection that is through other intermediate components including resistors, capacitor, diodes, transistors, and integrated circuits. A component may also be "coupled" to another component through modulators, converters, and communications interfaces.

What is claimed is:

1. A method comprising:
   receiving an image of a scene from an imaging sensor system, the image having a plurality of pixels each pixel having a corresponding multiple bit intensity value;
   counting a number of pixels having each of a plurality of multiple bit intensity values of the corresponding multiple-bit intensity values;
   selecting a pixel intensity value with a lowest count;
   generating a mapping function that combines the pixels of the pixel intensity value with the lowest count with pixels having an adjacent pixel intensity value into a single combined pixel intensity value;
   mapping the pixels according to the mapping function;
   selecting a next pixel intensity value with a lowest count after mapping the pixels;
   generating an addition to the mapping function to combine the pixels of the selected next pixel intensity value with pixels having an adjacent pixel intensity value into another single combined pixel intensity value;
   mapping the pixels according to the addition to the mapping function;
   repeating selecting a next pixel intensity value with a lowest count, generating a next addition to the mapping function to combine the pixels of the selected next pixel intensity value with pixels having an adjacent pixel intensity value into another single combined pixel intensity value, and mapping the pixels according to the next addition until a total number of pixel intensity values is reduced to a predetermined number;
   generating a reduced bit depth image using the predetermined number of pixel intensity values by assigning a new pixel intensity value to each of the pixels using the mapping function including the additions; and sending the reduced bit depth image to an image analysis system.

2. The method of claim 1, further comprising sending the mapping function to the image analysis system.

3. The method of claim 2, further comprising receiving the reduced bit depth image and the mapping function and regenerating the original image with reduced pixel bit depth.

4. The method of claim 1, wherein the plurality of multiple bit intensity values do not include the least significant bit of the multiple bit values.

5. The method of claim 1, wherein receiving an image comprises receiving a companded high dynamic range image.

6. The method of claim 1, further comprising selecting the pixels having an adjacent pixel intensity value before generating the mapping function by:

identifying an adjacent lower pixel intensity value and an adjacent higher pixel intensity value to the selected pixel intensity value;

comparing the counts of the respective identified pixel intensity values; and selecting the identified adjacent pixel intensity value having the lower count based on the comparing, wherein generating a mapping function comprises generating a mapping function that combines the pixels with the lowest intensity value with pixels having the selected adjacent pixel intensity.

7. The method claim 6, further comprising identifying a next adjacent lower and a next adjacent higher pixel intensity value and wherein selecting the identified adjacent pixel intensity value includes selecting from among the adjacent and the next adjacent pixel intensity values.

8. The method of claim 1, wherein selecting a pixel intensity value comprises selecting a pixel intensity value with a lowest local count within a local range of pixel intensity values.

9. The method of claim 8, wherein repeating comprises repeating in each of a plurality of local ranges of pixel intensity values.

10. The method of claim 1, wherein counting a number of pixels comprises binning each pixel based on a respective one of the plurality of multiple bit intensity values, wherein each bin has a bin value that represents a multiple bit pixel intensity value, and each bin has a density that represents the counted number of pixels for the respective bin, wherein generating a mapping function comprises generating a reduced bit depth image histogram using the predetermined number of bins by assigning a new multiple bit value to each of the predetermined number of pixel intensity values, and wherein generating a reduced bit depth image comprises generating an image using the reduced bit depth histogram.

11. The method of claim 10, wherein selecting a pixel intensity value comprises selecting a bin and wherein generating a mapping function comprises generating a mapping function that combines the selected bin with an adjacent bin.

12. The method of claim 10, further comprising forming a new single bin based on the pixels of combining the pixels with the lowest count with pixels having an adjacent pixel intensity value and assigning the bin value of the lowest count bin to the new bin.

13. The method of claim 10, wherein generating a reduced bit depth image histogram comprises assigning a sequential multiple bit value to each bin based on the corresponding original bin values.

14. One or more tangible, non-transitory memories having instructions stored thereon that when executed by one or more processors cause the one or more processors to perform operations comprising:

receiving an image of a scene from an imaging sensor system, the image having a plurality of pixels each pixel having a corresponding multiple bit intensity value;

counting a number of pixels having each of a plurality of multiple bit intensity values of the corresponding multiple-bit intensity values;

selecting a pixel intensity value with a lowest count;

generating a mapping function that combines the pixels of the pixel intensity value with the lowest count with pixels having an adjacent pixel intensity value into a single combined pixel intensity value;

mapping the pixels according to the mapping function;

selecting a next pixel intensity value with a lowest count after mapping the pixels;

generating an addition to the mapping function to combine the pixels of the selected next pixel intensity value with pixels having an adjacent pixel intensity value into another single combined pixel intensity value;

mapping the pixels according to the addition to the mapping function;

repeating selecting a next pixel intensity value with a lowest count, generating a next addition to the mapping function to combine the pixels of the selected next pixel intensity value with pixels having an adjacent pixel intensity value into another single combined pixel intensity value, and mapping the pixels according to the next addition until a total number of pixel intensity values is reduced to a predetermined number;

generating a reduced bit depth image using the predetermined number of pixel intensity values by assigning a new pixel intensity value to each of the pixels using the mapping function including the additions; and sending the reduced bit depth image to an image analysis system.

15. The memories of claim 14, the operations further comprising:

selecting the pixels having an adjacent pixel intensity value before generating the mapping function by:

identifying a next lower pixel intensity value and a next higher pixel intensity value to the selected pixel intensity value;

comparing the counts of the respective identified pixel intensity values; and selecting the identified adjacent pixel intensity value having the lower count, and wherein generating a mapping function comprises generating a mapping function that combines the pixels with the lowest intensity value with pixels having the selected adjacent pixel intensity.

16. A vehicle sensor system comprising:

a buffer to receive an image of a scene from an imaging sensor system, the image having a plurality of pixels each pixel having a corresponding multiple bit intensity value;

a processor coupled to the buffer configured to count a number of pixels having each of a plurality of multiple bit intensity values of the corresponding multiple-bit values, to select a pixel intensity value with a lowest count, to generate a mapping function that combines the pixels with the lowest count with pixels having an adjacent pixel intensity value, to repeat selecting a pixel intensity value with a lowest count and generating a mapping function that combines the pixels with the lowest intensity value with pixels having an adjacent pixel intensity value until a total number of pixel intensity value counts is reduced to a predetermined number, and to generate a reduced bit depth image using the predetermined number of pixel intensity value counts by assigning a new pixel intensity value to each of the pixels using the mapping function; and a bus connector to send the reduced bit depth image to an image analysis system.

17. The system of claim 16, further comprising the image analysis system configured to receive the reduced bit depth image and the mapping function and to regenerate the original image with reduced pixel bit depth.

18. A method comprising:

receiving an image of a scene from an imaging sensor system, the image having a plurality of pixels each pixel having a corresponding multiple bit intensity value;

mapping pixels having a pixel intensity value with a lowest pixel count to an adjacent pixel intensity value;

repeating mapping the pixels having the pixel intensity value with the lowest pixel count to an adjacent pixel intensity value until a total number of different pixel intensity values is reduced to a predetermined number of different pixel intensity values;

generating a mapping function that combines the pixel mappings;

generating a reduced bit depth image using the predetermined number of pixel intensity values by assigning a new pixel intensity value to each of the pixels using the mapping function; and sending the reduced bit depth image to an image analysis system.

19. The method of claim 18, wherein mapping comprises assigning a single pixel intensity value to the pixels having the pixel intensity value with the lowest pixel count and pixels having the adjacent pixel intensity value.

20. The method of claim 18, wherein mapping comprises selecting an adjacent pixel intensity value having a lowest pixel count of adjacent pixel intensity values and wherein mapping to the adjacent pixel intensity value comprises mapping to the selected adjacent pixel intensity value.

* * * * *